(12) United States Patent
Papallo et al.

(10) Patent No.: US 7,043,340 B2
(45) Date of Patent: *May 9, 2006

(54) PROTECTION SYSTEM FOR POWER DISTRIBUTION SYSTEMS

(75) Inventors: Thomas F. Papallo, Farmington, CT (US); Indra Purkayastha, West Simsbury, CT (US); Emad Andarawis Andarawis, Ballston Lake, NY (US); Ertugrul Berkcan, Clifton Park, NY (US); Scott Charles Evans, Burnt Hills, NY (US); Rahul Gore, Maharashtra (IN); Mingxiao Jiang, Clifton Park, NY (US); Shobhana Mani, Clifton Park, NY (US); Daniel Lawrence Morrill, Scotia, NY (US); Eugene Joseph Orlowski, Jr., Scotia, NY (US); Marc Robert Pearlman, Clifton Park, NY (US); William James Premerlani, Scotia, NY (US); Ramakrishna Rao, Karnataka (IN); Samantha Rao, Bangalor (IN); Austars Raymond Schnore, Jr., Scotia, NY (US); Charles Scott Sealing, Clifton Park, NY (US); Daniel White Sexton, Niskayuna, NY (US); Somashekhar Basavaraj, Bangalore (IN); Terry Michael Topka, Scotia, NY (US)

(73) Assignee: General Electric Company, Schenectady, NY (US)

( * ) Notice: Subject to any disclaimer, the term of this patent is extended or adjusted under 35 U.S.C. 154(b) by 192 days.

This patent is subject to a terminal disclaimer.

(21) Appl. No.: 10/373,679

(22) Filed: Feb. 25, 2003

(65) Prior Publication Data

US 2004/0019410 A1    Jan. 29, 2004

Related U.S. Application Data

(60) Provisional application No. 60/359,544, filed on Feb. 25, 2002, provisional application No. 60/438,159, filed on Jan. 6, 2003.

(51) Int. Cl.
*G06F 19/00* (2006.01)

(52) U.S. Cl. .......................... 700/292; 700/74
(58) Field of Classification Search ................ 700/292, 700/293, 294, 74; 702/62, 64, 60, 57; 361/65, 361/68, 64, 66

See application file for complete search history.

(56) References Cited

U.S. PATENT DOCUMENTS

| | | |
|---|---|---|
| 3,772,505 A | 11/1973 | Massell |
| 3,938,007 A | 2/1976 | Boniger et al. |
| 3,956,671 A | 5/1976 | Nimmersjo |
| 3,963,964 A | 6/1976 | Mustaphi |
| 4,001,742 A | 1/1977 | Jencks et al. |
| 4,245,318 A | 1/1981 | Eckart et al. |
| 4,291,299 A | 9/1981 | Hinz et al. |
| 4,301,433 A | 11/1981 | Castonguay et al. |
| 4,311,919 A | 1/1982 | Nail |
| 4,415,968 A | 11/1983 | Maeda et al. |
| 4,423,459 A | 12/1983 | Stich et al. |
| 4,432,031 A | 2/1984 | Premerlani |
| 4,455,612 A | 6/1984 | Girgis et al. |
| 4,468,714 A | 8/1984 | Russell |
| 4,589,074 A | 5/1986 | Thomas et al. |
| 4,612,594 A * | 9/1986 | Yamaura et al. .............. 361/68 |
| 4,623,949 A | 11/1986 | Salowe et al. |
| 4,631,625 A | 12/1986 | Alexander et al. |
| 4,642,724 A | 2/1987 | Ruta |
| 4,652,966 A | 3/1987 | Farag et al. |
| 4,672,501 A | 6/1987 | Bilac et al. |
| 4,672,555 A | 6/1987 | Hart et al. |
| 4,674,062 A | 6/1987 | Premerlani |
| 4,689,712 A | 8/1987 | Demeyer |
| 4,709,339 A | 11/1987 | Fernandes |
| 4,751,653 A | 6/1988 | Junk et al. |
| 4,752,853 A | 6/1988 | Matsko et al. |
| 4,754,407 A | 6/1988 | Nolan |
| 4,777,607 A | 10/1988 | Maury et al. |
| 4,783,748 A | 11/1988 | Swarztrauber et al. |

| Patent No. | Date | Inventor |
|---|---|---|
| 4,796,027 A | 1/1989 | Smith-Vaniz |
| 4,833,592 A | 5/1989 | Yamanaka |
| 4,849,848 A | 7/1989 | Ishii |
| 4,855,671 A | 8/1989 | Fernandes |
| 4,862,308 A | 8/1989 | Udren |
| 4,964,058 A | 10/1990 | Brown, Jr. |
| 4,979,122 A | 12/1990 | Davis et al. |
| 4,983,955 A | 1/1991 | Ham, Jr. et al. |
| 4,996,646 A | 2/1991 | Farrington |
| 5,053,735 A | 10/1991 | Ohishi et al. |
| 5,060,166 A | 10/1991 | Engel et al. |
| 5,101,191 A | 3/1992 | MacFadyen et al. |
| 5,134,691 A | 7/1992 | Elms |
| 5,136,458 A | 8/1992 | Durivage, III |
| 5,162,664 A | 11/1992 | Haun et al. |
| 5,166,887 A | 11/1992 | Farrington et al. |
| 5,170,310 A | 12/1992 | Studtmann et al. |
| 5,170,360 A | 12/1992 | Porter et al. |
| 5,179,376 A | 1/1993 | Pomatto |
| 5,182,547 A | 1/1993 | Griffith |
| 5,185,705 A | 2/1993 | Farrington |
| 5,196,831 A | 3/1993 | Bscheider |
| 5,214,560 A | 5/1993 | Jensen |
| 5,216,621 A | 6/1993 | Dickens |
| 5,225,994 A | 7/1993 | Arinobu et al. |
| 5,231,565 A | 7/1993 | Bilas et al. |
| 5,237,511 A | 8/1993 | Caird et al. |
| 5,247,454 A | 9/1993 | Farrington et al. |
| 5,253,159 A | 10/1993 | Bilas et al. |
| 5,272,438 A | 12/1993 | Stumme |
| 5,301,121 A | 4/1994 | Garverick et al. |
| 5,305,174 A | 4/1994 | Morita et al. |
| 5,311,392 A | 5/1994 | Kinney et al. |
| 5,323,307 A | 6/1994 | Wolf et al. |
| 5,353,188 A | 10/1994 | Hatakeyama |
| 5,361,184 A | 11/1994 | El-Sharkawi et al. |
| 5,367,427 A | 11/1994 | Matsko et al. |
| 5,369,356 A | 11/1994 | Kinney et al. |
| 5,381,554 A | 1/1995 | Langer et al. |
| 5,384,712 A | 1/1995 | Oravetz et al. |
| 5,402,299 A | 3/1995 | Bellei |
| 5,406,495 A | 4/1995 | Hill |
| 5,414,635 A | 5/1995 | Ohta |
| 5,420,799 A | 5/1995 | Peterson et al. |
| 5,422,778 A | 6/1995 | Good et al. |
| 5,440,441 A | 8/1995 | Ahuja |
| 5,451,879 A | 9/1995 | Moore |
| 5,487,016 A | 1/1996 | Elms |
| 5,490,086 A | 2/1996 | Leone et al. |
| 5,493,468 A | 2/1996 | Hunter et al. |
| 5,530,738 A | 6/1996 | McEachern |
| 5,534,782 A | 7/1996 | Nourse |
| 5,534,833 A | 7/1996 | Castonguay et al. |
| 5,537,327 A | 7/1996 | Snow et al. |
| 5,544,065 A | 8/1996 | Engel et al. |
| 5,559,719 A | 9/1996 | Johnson et al. |
| 5,560,022 A | 9/1996 | Dunstan et al. |
| 5,576,625 A | 11/1996 | Sukegawa et al. |
| 5,581,471 A | 12/1996 | McEachern et al. |
| 5,587,917 A | 12/1996 | Elms |
| 5,596,473 A | 1/1997 | Johnson et al. |
| 5,600,527 A | 2/1997 | Engel et al. |
| 5,608,646 A | 3/1997 | Pomatto |
| 5,613,798 A | 3/1997 | Braverman |
| 5,619,392 A | 4/1997 | Bertsch et al. |
| 5,627,716 A | 5/1997 | Lagree et al. |
| 5,627,717 A | 5/1997 | Pein et al. |
| 5,627,718 A | 5/1997 | Engel et al. |
| 5,629,825 A | 5/1997 | Wallis et al. |
| 5,631,798 A | 5/1997 | Seymour et al. |
| 5,638,296 A | 6/1997 | Johnson et al. |
| 5,650,936 A | 7/1997 | Loucks et al. |
| 5,661,658 A | 8/1997 | Putt et al. |
| 5,666,256 A | 9/1997 | Zavis et al. |
| 5,670,923 A | 9/1997 | Gonzalez et al. |
| 5,694,329 A | 12/1997 | Pomatto |
| 5,696,695 A | 12/1997 | Ehlers et al. |
| 5,719,738 A | 2/1998 | Singer et al. |
| 5,734,576 A | 3/1998 | Klancher |
| 5,736,847 A | 4/1998 | Van Doorn et al. |
| 5,737,231 A | 4/1998 | Pyle et al. |
| 5,742,513 A | 4/1998 | Bouhenguel et al. |
| 5,751,524 A | 5/1998 | Swindler |
| 5,754,033 A | 5/1998 | Thomson |
| 5,754,440 A | 5/1998 | Cox et al. |
| 5,768,148 A | 6/1998 | Murphy et al. |
| 5,784,237 A | 7/1998 | Velez |
| 5,784,243 A | 7/1998 | Pollman et al. |
| 5,786,699 A | 7/1998 | Sukegawa et al. |
| 5,812,389 A | 9/1998 | Katayama et al. |
| 5,821,704 A | 10/1998 | Carson et al. |
| 5,825,643 A | 10/1998 | Dvorak et al. |
| 5,828,576 A | 10/1998 | Loucks et al. |
| 5,828,983 A | 10/1998 | Lombardi |
| 5,831,428 A | 11/1998 | Pyle et al. |
| 5,867,385 A | 2/1999 | Brown et al. |
| 5,872,722 A | 2/1999 | Oravetz et al. |
| 5,872,785 A | 2/1999 | Kienberger |
| 5,890,097 A | 3/1999 | Cox |
| 5,892,449 A | 4/1999 | Reid et al. |
| 5,903,426 A | 5/1999 | Ehling |
| 5,905,616 A | 5/1999 | Lyke |
| 5,906,271 A | 5/1999 | Castonguay et al. |
| 5,926,089 A | 7/1999 | Sekiguchi et al. |
| 5,936,817 A | 8/1999 | Matsko et al. |
| 5,946,210 A | 8/1999 | Montminy et al. |
| 5,958,060 A | 9/1999 | Premerlani |
| 5,963,457 A | 10/1999 | Kanoi et al. |
| 5,973,481 A | 10/1999 | Thompson et al. |
| 5,973,899 A | 10/1999 | Williams et al. |
| 5,982,595 A | 11/1999 | Pozzuoli |
| 5,982,596 A | 11/1999 | Spencer et al. |
| 5,995,911 A * | 11/1999 | Hart .......................... 702/64 |
| 6,005,757 A | 12/1999 | Shvach et al. |
| 6,005,758 A | 12/1999 | Spencer et al. |
| 6,018,451 A | 1/2000 | Lyke et al. |
| 6,038,516 A | 3/2000 | Alexander et al. |
| 6,047,321 A | 4/2000 | Raab et al. |
| 6,054,661 A | 4/2000 | Castonguay et al. |
| 6,055,145 A | 4/2000 | Lagree et al. |
| 6,061,609 A | 5/2000 | Kanoi et al. |
| 6,084,758 A | 7/2000 | Clarey et al. |
| 6,138,241 A | 10/2000 | Eckel et al. |
| 6,139,327 A | 10/2000 | Callahan et al. |
| 6,141,196 A | 10/2000 | Premerlani et al. |
| 6,157,527 A | 12/2000 | Spencer et al. |
| 6,167,329 A | 12/2000 | Engel et al. |
| 6,175,780 B1 | 1/2001 | Engel |
| 6,185,482 B1 | 2/2001 | Egolf et al. |
| 6,185,508 B1 | 2/2001 | Van Doorn et al. |
| 6,186,842 B1 | 2/2001 | Hirschbold et al. |
| 6,195,243 B1 | 2/2001 | Spencer et al. |
| 6,198,402 B1 | 3/2001 | Hasegawa et al. |
| 6,212,049 B1 | 4/2001 | Spencer et al. |
| 6,233,128 B1 | 5/2001 | Spencer et al. |
| 6,236,949 B1 | 5/2001 | Hart |
| 6,242,703 B1 | 6/2001 | Castonguay et al. |
| 6,268,991 B1 | 7/2001 | Criniti et al. |
| 6,285,917 B1 | 9/2001 | Sekiguchi et al. |
| 6,288,882 B1 | 9/2001 | DiSalvo et al. |
| 6,289,267 B1 | 9/2001 | Alexander et al. |
| 6,291,911 B1 | 9/2001 | Dunk et al. |
| 6,292,340 B1 | 9/2001 | O'Regan et al. |
| 6,292,717 B1 | 9/2001 | Alexander et al. |
| 6,292,901 B1 | 9/2001 | Lys et al. |
| 6,297,939 B1 | 10/2001 | Bilac et al. |

| | | |
|---|---|---|
| 6,313,975 B1 | 11/2001 | Dunne et al. |
| 6,341,054 B1 | 1/2002 | Walder et al. |
| 6,347,027 B1 | 2/2002 | Nelson et al. |
| 6,351,823 B1 | 2/2002 | Mayer et al. |
| 6,356,422 B1 | 3/2002 | Bilac et al. |
| 6,356,849 B1 | 3/2002 | Jaffe |
| 6,369,996 B1 | 4/2002 | Bo |
| 6,377,051 B1 | 4/2002 | Tyner et al. |
| 6,385,022 B1 | 5/2002 | Kulidjian et al. |
| 6,396,279 B1 | 5/2002 | Gruenert |
| 6,397,155 B1 | 5/2002 | Przydatek et al. |
| 6,405,104 B1 | 6/2002 | Dougherty |
| 6,406,328 B1 | 6/2002 | Attarian et al. |
| 6,411,865 B1 | 6/2002 | Qin et al. |
| 6,441,931 B1 | 8/2002 | Moskovich et al. |
| 6,459,997 B1 | 10/2002 | Anderson |
| 6,496,342 B1 * | 12/2002 | Horvath et al. ............... 361/65 |
| 6,535,797 B1 | 3/2003 | Bowles et al. |
| 6,549,880 B1 | 4/2003 | Willoughby et al. |
| 6,553,418 B1 | 4/2003 | Collins et al. |
| 6,892,115 B1 * | 5/2005 | Berkcan et al. ............. 700/286 |
| 2001/0010032 A1 | 7/2001 | Ehlers et al. |
| 2001/0032025 A1 | 10/2001 | Lenz et al. |
| 2001/0044588 A1 | 11/2001 | Mault |
| 2001/0048354 A1 | 12/2001 | Douville et al. |
| 2001/0055965 A1 | 12/2001 | Delp et al. |
| 2002/0010518 A1 | 1/2002 | Reid et al. |
| 2002/0032535 A1 | 3/2002 | Alexander et al. |
| 2002/0034086 A1 | 3/2002 | Scoggins et al. |
| 2002/0045992 A1 | 4/2002 | Shincovich et al. |
| 2002/0059401 A1 | 5/2002 | Austin |
| 2002/0063635 A1 | 5/2002 | Shincovich |
| 2002/0064010 A1 | 5/2002 | Nelson et al. |
| 2002/0091949 A1 | 7/2002 | Ykema |
| 2002/0094799 A1 | 7/2002 | Elliott et al. |
| 2002/0107615 A1 | 8/2002 | Bjorklund |
| 2002/0108065 A1 | 8/2002 | Mares |
| 2002/0109722 A1 | 8/2002 | Rogers et al. |
| 2002/0111980 A1 | 8/2002 | MIller et al. |
| 2002/0116092 A1 | 8/2002 | Hamamatsu et al. |
| 2002/0124011 A1 | 9/2002 | Baxter et al. |
| 2002/0146076 A1 | 10/2002 | Lee |
| 2002/0146083 A1 | 10/2002 | Lee et al. |
| 2002/0147503 A1 | 10/2002 | Osburn, III |
| 2002/0159402 A1 | 10/2002 | Binder |
| 2002/0162014 A1 | 10/2002 | Przydatek et al. |
| 2002/0163918 A1 | 11/2002 | Cline |
| 2002/0165677 A1 | 11/2002 | Lightbody et al. |
| 2002/0181174 A1 | 12/2002 | Bilac et al. |
| 2002/0193888 A1 | 12/2002 | Wewalaarachchi et al. |
| 2003/0043785 A1 | 3/2003 | Liu et al. |
| 2003/0212515 A1 * | 11/2003 | Fletcher et al. ............... 702/60 |

FOREIGN PATENT DOCUMENTS

| | | |
|---|---|---|
| EP | 0718948 A2 | 6/1996 |
| EP | 0949734 A2 | 10/1999 |

OTHER PUBLICATIONS

Atanackovic D. et al. An Integrated Knowledge-Based Model For Power-System Planning IEEE Expert, IEEE Inc. New York, Jul. 1997; pp. 65-71.

* cited by examiner

*Primary Examiner*—Leo Picard
*Assistant Examiner*—Steven R. Garland
(74) *Attorney, Agent, or Firm*—Ohlandt, Greeley, Ruggiero & Perle, L.L.P.

(57) ABSTRACT

A protection system for a power distribution system is provided. The protection system includes a central computer, a plurality of data modules, and a data network. The data modules are each in communication with a different circuit breaker of the power distribution system. The data network communicates between the central computer and the plurality of data modules. The central computer sends an instruction to the plurality of data modules over the data network to aid in synchronization of sampling of a power condition at the plurality of data modules.

29 Claims, 4 Drawing Sheets

PROTECTION SYSTEM FOR POWER DISTRIBUTION SYSTEMS

CROSS REFERENCE TO RELATED APPLICATIONS

This application is related to U.S. Patent Application No. 60/359,544 filed on Feb. 25, 2002 for "Integrated Protection, Monitoring, and Control" the contents of which are incorporated by reference herein. This application is also related to U.S. Patent Application No. 60/438,159 filed on Jan. 6, 2003 for "Single Processor Concept for Protection and Control of Circuit Breakers in Low-Voltage Switchgear" the contents of which are incorporated by reference herein.

BACKGROUND OF THE INVENTION

The present disclosure relates generally to power distribution systems. More particularly, the present disclosure relates to a protection system for power distribution systems.

Industrial power distribution systems commonly divide incoming power into a number of branch circuits. The branch circuits supply power to various equipment (i.e., loads) in the industrial facility. Circuit breakers are typically provided in each branch circuit to facilitate protecting equipment within the branch circuit. Circuit breakers are designed to open and close a circuit by non-automatic means and to open the circuit automatically on a predetermined overcurrent without damage to itself when properly applied within its rating. The circuit breakers commonly include supplementary protectors enclosed within the body of the circuit breaker. One common type of supplementary protector is known as an electronic trip unit. The circuit breaker and its supplementary protector have proven useful at managing the protection of the loads on the circuit.

However, it can be desired to integrate the load management of the branch circuits to one another. Further, it can be desired to integrate the management of the loads on the branch circuits with the management of the power feeds feeding the branch circuits. Still further, it can be desired to provide for monitoring of the system.

In order to provide this integrated protection and monitoring, prior power distribution systems have required costly and difficult to implement solutions. Today, each of these functions is performed by separate hardware often with separate sensors necessary to measure system parameters and auxiliary devices in power circuit interrupters to switch the power circuits. In such prior systems, hard wire connections between all of the electronic trip units in the system was required in order to coordinate the load control decisions of each independent trip unit with the other trip units in the system. Further, hard wire connections were also required to provide information for the independent electronic trip units to the separate system performing feed management decisions. The control decisions by the separate system performing feed management decisions is made more complex because the information from the various independent electronic trip unit is typically out of phase with one another. Additionally, another hardware device is required to then provide the desired monitoring functionality.

Accordingly, there is a continuing need for power distribution systems having a fully integrated protection system. Moreover, there is continuing need for low cost, easy to install, and easy to upgrade fully integrated protection system for power distribution systems.

SUMMARY OF THE INVENTION

In one exemplary embodiment, a protection system for a power distribution system is provided. The protection system includes a central computer, a plurality of data modules, and a data network. The data modules are each in communication with a different circuit breaker of the power distribution system. The data network communicates between the central computer and the plurality of data modules. The central computer sends an instruction to the plurality of data modules over the data network to aid in synchronization of sampling of a power condition at the plurality of data modules.

In another exemplary embodiment, a method of protecting a power distribution system is provided. The method includes sending a synchronization instruction to a plurality of data modules; sampling a power condition from the power distribution system in part based upon the synchronization instruction, each of the plurality of data modules being in communication with a different set of separable contacts in the power distribution system; transmitting a first message containing the power condition from each of the plurality of data modules to a central computer; determining a second message the central computer based upon the first message; and transmitting the second message to each of the plurality of data modules so that one or more of the plurality of data modules operates the different set of separable contacts in response to the second message.

In yet another exemplary embodiment, a power distribution system is provided. The power distribution system includes a processing unit, a first power bus, a first data module, a second data module, and a data network. The first power bus powers a first branch circuit through a first circuit breaker and a second branch circuit through a second circuit breaker. The first data module operates the first circuit breaker and samples a first parameter from the first branch circuit. Similarly, the second data operates the second circuit breaker and samples a second parameter from the second branch circuit. The data network links the first and second data modules to the processing unit. The processing unit performs all primary power distribution functions for the power distribution system based on the first and second parameters. The processing unit communicates a synchronization signal to the first and second data modules so that the first and second data modules sample the first and second parameters, respectively, within a predetermined time-window.

The above-described and other features and advantages of the present disclosure will be appreciated and understood by those skilled in the art from the following detailed description, drawings, and appended claims.

DETAILED DESCRIPTION

Figure 1:
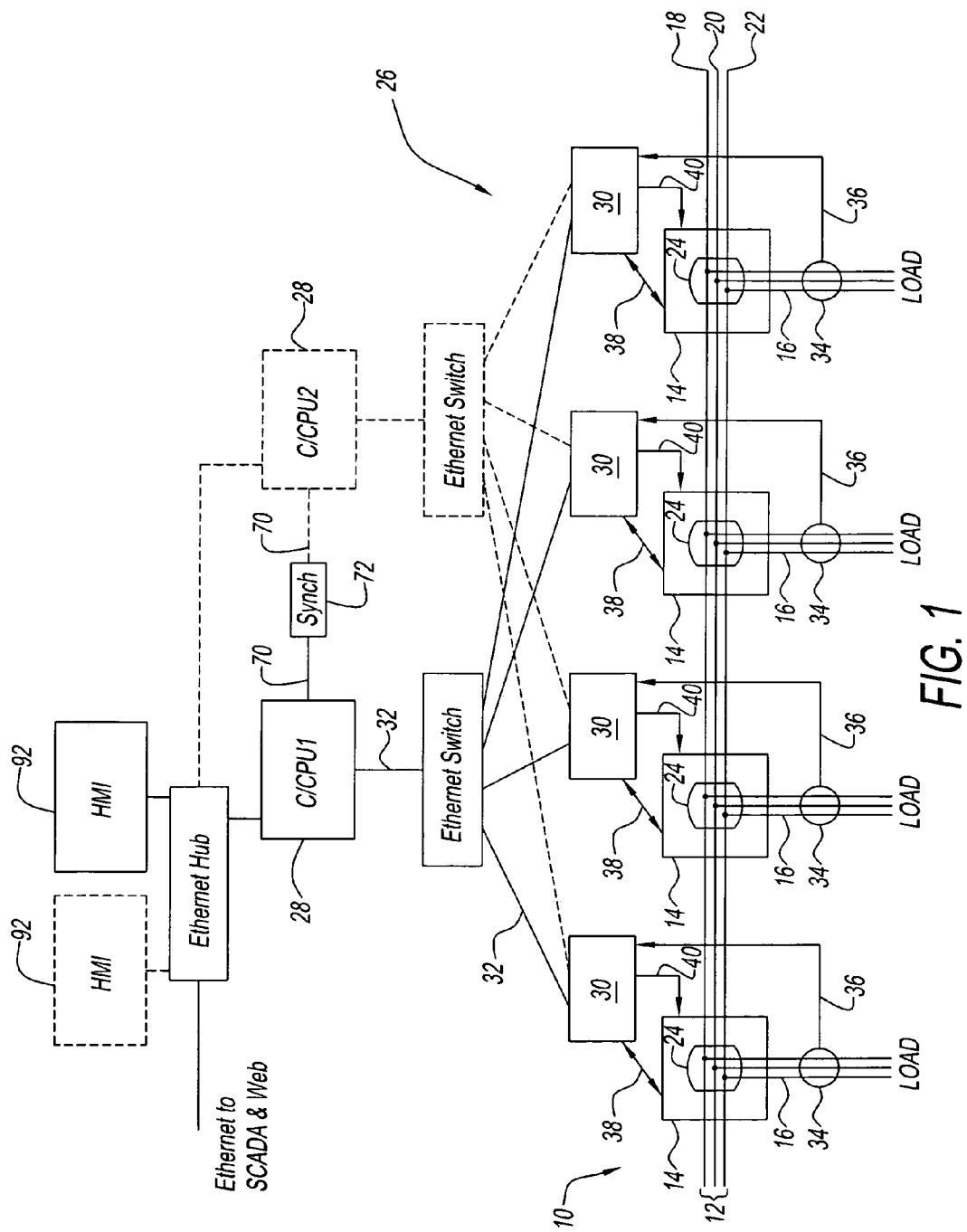
FIG. 1 is a schematic of a power distribution system having an exemplary embodiment of a integrated protection, monitoring, and control system.

Referring now to the drawings and in particular to FIG. 1, an exemplary embodiment of a power distribution system generally referred to by reference numeral 10 is illustrated. System 10 distributes power from at least one power bus 12 through a number or plurality of circuit breakers 14 to branch circuits 16.

Power bus 12 is illustrated by way of example as a three-phase power system having a first phase 18, a second phase 20, and a third phase 22. Power bus 12 can also include a neutral phase (not shown). System 10 is illustrated for purposes of clarity distributing power from power bus 12 to four circuits 16 by four breakers 14. Of course, it is contemplated by the present disclosure for power bus 12 to have any desired number of phases and/or for system 10 to have any desired number of circuit breakers 14.

Each circuit breaker 14 has a set of separable contacts 24 (illustrated schematically). Contacts 24 selectively place power bus 12 in communication with at least one load (also illustrated schematically) on circuit 16. The load can include devices, such as, but not limited to, motors, welding machinery, computers, heaters, lighting, and/or other electrical equipment.

Power distribution system 10 is illustrated in FIG. 1 with an exemplary embodiment of a centrally controlled and fully integrated protection, monitoring, and control system 26 (hereinafter "system"). System 26 is configured to control and monitor power distribution system 10 from a central control processing unit 28 (hereinafter "CCPU"). CCPU 28 communicates with a number or plurality of data sample and transmission modules 30 (hereinafter "module") over a data network 32. Network 32 communicates all of the information from all of the modules 30 substantially simultaneously to CCPU 28.

Thus, system 26 can include protection and control schemes that consider the value of electrical signals, such as current magnitude and phase, at one or all circuit breakers 14. Further, system 26 integrates the protection, control, and monitoring functions of the individual breakers 14 of power distribution system 10 in a single, centralized control processor (e.g., CCPU 28). System 26 provides CCPU 28 with all of a synchronized set of information available through digital communication with modules 30 and circuit breakers 14 on network 32 and provides the CCPU with the ability to operate these devices based on this complete set of data.

Specifically, CCPU 28 performs all primary power distribution functions for power distribution system 10. Namely, CCPU 28 performs all instantaneous overcurrent protection (IOC), sort time overcurrent, longtime overcurrent, relay protection, and logic control as well as digital signal processing functions of system 26. Thus, system 26 enables settings to be changed and data to be logged in single, central location, i.e., CCPU 28. CCPU 28 is described herein by way of example as a central processing unit. Of course, it is contemplated by the present disclosure for CCPU 28 to include any programmable circuit, such as, but not limited to, computers, processors, microcontrollers, microcomputers, programmable logic controllers, application specific integrated circuits, and other programmable circuits.

As shown in FIG. 1, each module 30 is in communication with one of the circuit breakers 14. Each module 30 is also in communication with at least one sensor 34 sensing a condition of the power in each phase (e.g., first phase 18, second phase 20, third phase 22, and neutral) of bus 12 and/or circuit 16. Sensors 34 can include current transformers (CTs), potential transformers (PTs), and any combination thereof. Sensors 34 monitor a condition of the incoming power in circuits 16 and provide a first signal 36 representative of the condition of the power to module 30. For example, sensors 34 can be current transformers that generate a secondary current proportional to the current in circuit 16 so that first signals 36 are the secondary current.

Module 30 sends and receives one or more second signals 38 to and/or from circuit breaker 14. Second signals 38 can be representative of one or more conditions of breaker 14, such as, but not limited to, a position of separable contacts 24, a spring charge switch status, and others. In addition, module 30 is configured to operate circuit breaker 14 by sending one or more third signals 40 to the breaker to open/close separable contacts 24 as desired. In a first embodiment, circuit breakers 14 cannot open separable contacts 24 unless instructed to do so by system 26.

System 26 utilizes data network 32 for data acquisition from modules 30 and data communication to the modules. Accordingly, network 32 is configured to provide a desired level of communication capacity and traffic management between CCPU 28 and modules 30. In an exemplary embodiment, network 32 can be configured to not enable communication between modules 30 (i.e., no module-to-module communication).

In addition, system 26 can be configured to provide a consistent fault response time. As used herein, the fault response time of system 26 is defined as the time between when a fault condition occurs and the time module 30 issues an trip command to its associated breaker 14. In an exemplary embodiment, system 26 has a fault response time that is less than a single cycle of the 60 Hz (hertz) waveform. For example, system 26 can have a maximum fault response time of about three milliseconds.

The configuration and operational protocols of network 32 are configured to provide the aforementioned communication capacity and response time. For example, network 32 can be an Ethernet network having a star topology as illustrated in FIG. 1. In this embodiment, network 32 is a full duplex network having the collision-detection multiple-access (CSMA/CD) protocols typically employed by Ethernet networks removed and/or disabled. Rather, network 32 is a switched Ethernet for managing collision domains.

In this configuration, network 32 provides a data transfer rate of at least about 100 Mbps (megabits per second). For example, the data transfer rate can be about 1 Gbps (gigabits per second). Additionally, communication between CCPU 28 and modules 30 across network 32 can be managed to optimize the use of network 32. For example, network 32 can be optimized by adjusting one or more of a message size, a message frequency, a message content, and/or a network speed.

Accordingly, network 32 provides for a response time that includes scheduled communications, a fixed message length, full-duplex operating mode, and a switch to prevent collisions so that all messages are moved to memory in CCPU 28 before the next set of messages is scheduled to arrive. Thus, system 26 can perform the desired control, monitoring, and protection functions in a central location and manner.

It should be recognized that data network 32 is described above by way of example only as an Ethernet network having a particular configuration, topography, and data transmission protocols. Of course, the present disclosure contemplates the use of any data transmission network that ensures the desired data capacity and consistent fault response time necessary to perform the desired range of functionality. The exemplary embodiment achieves subcycle transmission times between CCPU 28 and modules 30 and full sample data to perform all power distribution functions for multiple modules with the accuracy and speed associated with traditional devices.

CCPU 28 can perform branch circuit protection, zone protection, and relay protection interdependently because all of the system information is in one central location, namely at the CCPU. In addition, CCPU 28 can perform one or more monitoring functions on the centrally located system information. Accordingly, system 26 provides a coherent and integrated protection, control, and monitoring methodology not considered by prior systems. For example, system 26 integrates and coordinates load management, feed management, system monitoring, and other system protection functions in a low cost and easy to install system.

For purposes of clarity, the load management capabilities of system 26 are described with reference to FIGS. 1 and 2, while the feed management capabilities of the system 26 are described with reference to FIG. 3.

Figure 2:
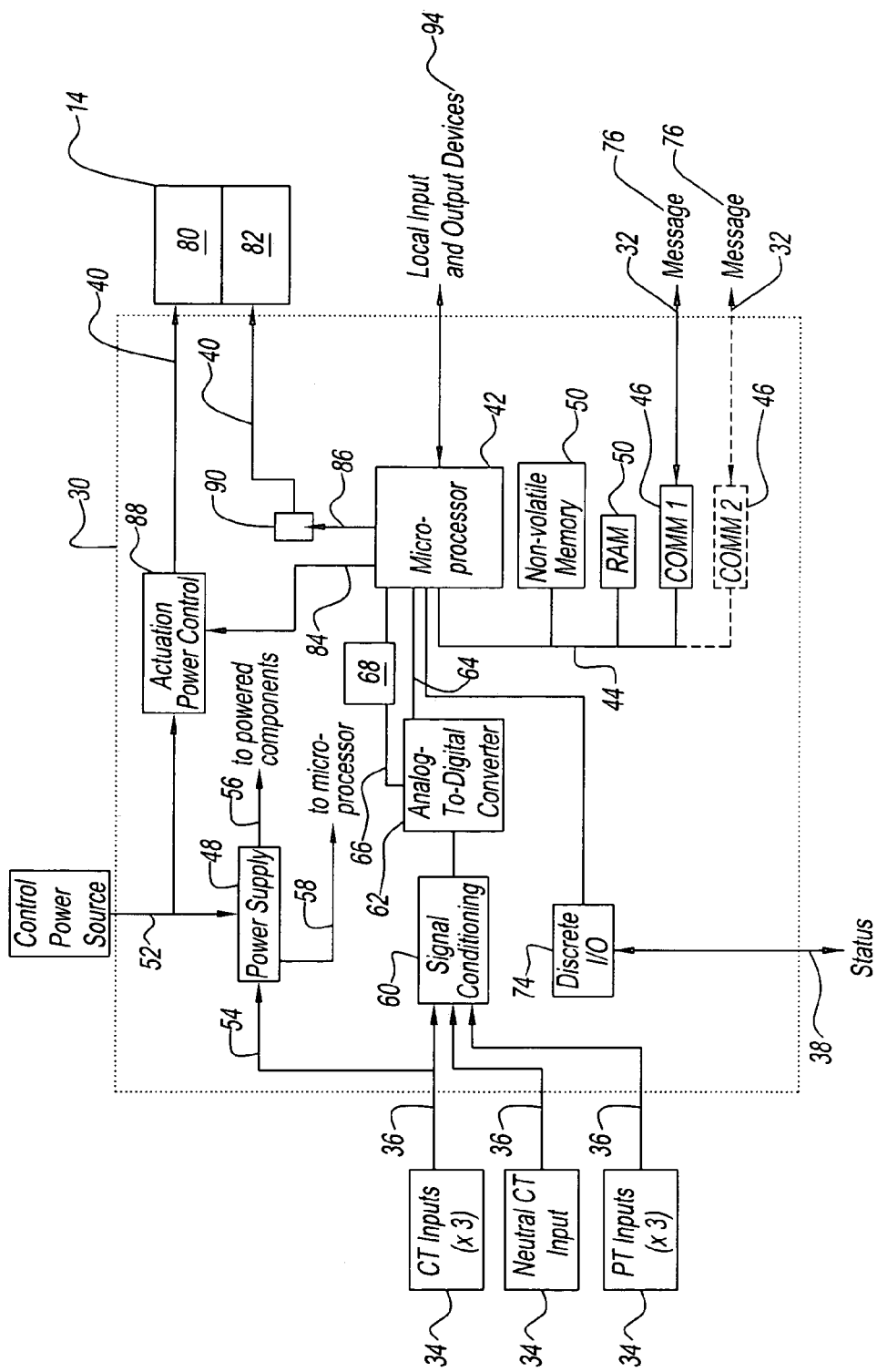
FIG. 2 is a schematic of an exemplary embodiment of a data sample and transmission module of the integrated protection, monitoring, and control system of FIG. 1.

An exemplary embodiment of module 30 is illustrated in FIG. 2. Module 30 has a microprocessor 42, a data bus 44, a network interface 46, a power supply 48, and one or more memory devices 50.

Power supply 48 is configured to receive power from a first source 52 and/or a second source 54. First source 52 can be one or more of an uninterruptible power supply (not shown), a plurality of batteries (not shown), a power bus (not shown), and other sources. In the illustrated embodiment, second source 54 is the secondary current available from sensors 34.

Power supply 48 is configured to provide power 56 to module 30 from first and second sources 52, 54. For example, power supply 48 can provide power 56 to microprocessor 42, data bus 42, network interface 44, and memory devices 50. Power supply 48 is also configured to provide a fourth signal 58 to microprocessor 42. Fourth signal 58 is indicative of what sources are supplying power to power supply 48. For example, fourth signal 58 can indicate whether power supply 48 is receiving power from first source 52, second source 54, or both of the first and second sources.

Network interface 46 and memory devices 50 communicate with microprocessor 42 over data bus 44. Network interface 46 can be connected to network 32 so that microprocessor 42 is in communication with CCPU 28.

Microprocessor 42 receives digital representations of first signals 36 and second signals 38. First signals 36 are continuous analog data collected by sensors 34, while second signals 38 are discrete analog data from breaker 14. Thus, the data sent from modules 30 to CCPU 28 is a digital representation of the actual voltages, currents, and device status. For example, first signals 36 can be analog signals indicative of the current and/or voltage in circuit 16.

Accordingly, system 26 provides the actual raw parametric or discrete electrical data (i.e., first signals 36) and device physical status (i.e., second signal 38) to CCPU 28 via network 32, rather than processed summary information sampled, created, and stored by devices such as trip units, meters, or relays. As a result, CCPU 28 has complete, raw system-wide data with which to make decisions and can therefore operate any or all breakers 14 on network 32 based on information derived from as many modules 30 as the control and protection algorithms resident in CCPU 28 require.

Module 30 has a signal conditioner 60 and an analog-digital converter 62. First signals 36 are conditioned by signal conditioner 60 and converted to digital signals 64 by A/D converter 62. Thus, module 30 collects first signals 36 and presents digital signals 64, representative of the raw data in the first signals, to microprocessor 42. For example, signal conditioner 60 can includes a filtering circuit (not shown) to improve a signal-to-noise ratio first signal 36, a gain circuit (not shown) to amplify the first signal, a level adjustment circuit (not shown) to shift the first signal to a predetermined range, an impedance match circuit (not shown) to facilitate transfer of the first signal to A/D converter 62, and any combination thereof. Further, A/D converter 62 can be a sample-and-hold converter with external conversion start signal 66 from microprocessor 42 or a clock circuit 68 controlled by microprocessor 42 to facilitate synchronization of digital signals 64.

It is desired for digital signals 64 from all of the modules 30 in system 26 to be collected at substantially the same time. Specifically, it is desired for digital signals 64 from all of the modules 30 in system 26 to be representative of substantially the same time instance of the power in power distribution system 10.

Modules 30 sample digital signals 64 based, at least in part, upon a synchronization signal or instruction 70 as illustrated in FIG. 1. Synchronization instruction 70 can be generated from a synchronizing clock 72 that is internal or external to CCPU 28. Synchronization instruction 70 is simultaneously communicated from CCPU 28 to modules 30 over network 32. Synchronizing clock 72 sends synchronization instructions 70 at regular intervals to CCPU 28, which forwards the instructions to all modules 30 on network 32.

Modules 30 use synchronization instruction 70 to modify a resident sampling protocol. For example, each module 30 can have a synchronization algorithm resident on microprocessor 42. The synchronization algorithm resident on microprocessor 42 can be a software phase-lock-loop algorithm. The software phase-lock-loop algorithm adjusts the sample period of module 30 based, in part, on synchronization instructions 70 from CCPU 28. Thus, CCPU 28 and modules 30 work together in system 26 to ensure that the sampling (i.e., digital signals 64) from all of the modules in the system are synchronized.

Accordingly, system 26 is configured to collect digital signals 64 from modules 30 based in part on synchronization instruction 70 so that the digital signals are representative of the same time instance, such as being within a predetermined time-window from one another. Thus, CCPU 28 can have a set of accurate data representative of the state of each monitored location (e.g., modules 30) within the power distribution system 10. The predetermined time-window can be less than about ten microseconds. For example, the predetermined time-window can be about five microseconds.

The predetermined time-window of system 26 can be affected by the port-to-port variability of network 32. In an exemplary embodiment, network 32 has a port-to-port variability of in a range of about 24 nanoseconds to about 720 nanoseconds. In an alternate exemplary embodiment, network 32 has a maximum port-to-port variability of about 2 microseconds.

It has been determined that control of all of modules 30 to this predetermined time-window by system 26 enables a desired level of accuracy in the metering and vector functions across the modules, system waveform capture with coordinated data, accurate event logs, and other features. In an exemplary embodiment, the desired level of accuracy is equal to the accuracy and speed of traditional devices. For example, the predetermined time-window of about ten microseconds provides an accuracy of about 99% in metering and vector functions.

Second signals 38 from each circuit breaker 14 to each module 30 are indicative of one or more conditions of the circuit breaker. Second signals 38 are provided to a discrete I/O circuit 74 of module 30. Circuit 74 is in communication with circuit breaker 14 and microprocessor 42. Circuit 74 is configured to ensure that second signals 38 from circuit breaker 14 are provided to microprocessor 42 at a desired voltage and without jitter. For example, circuit 74 can include de-bounce circuitry and a plurality of comparators.

Microprocessor 42 samples first and second signals 36, 38 as synchronized by CCPU 28. Then, converter 62 converts the first and second signals 36, 38 to digital signals 64, which is packaged into a first message 76 having a desired configuration by microprocessor 42. First message 76 can include an indicator that indicates which synchronization signal 70 the first message was in response to. Thus, the indicator of which synchronization signal 70 first message 76 is responding to is returned to CCPU 28 for sample time identification.

CCPU 28 receives first message 76 from each of the modules 30 over network 32 and executes one or more protection and/or monitoring algorithms on the data sent in all of the first messages. Based on first message 76 from one or more modules 30, CCPU 28 can control the operation of one or more circuit breakers 14. For example, when CCPU 28 detects a fault from one or more of first messages 76, the CCPU sends a second message 78 to one or more modules 30 via network 32.

In response to second message 78, microprocessor 42 causes third signal 40 to operate (e.g., open contacts 24) circuit breaker 14. Circuit breaker 14 can include more than one operation mechanism. For example, circuit breaker 14 can have a shunt trip 80 and a magnetically held solenoid 82. Microprocessor 42 is configured to send a first output 84 to operate shunt trip 80 and/or a second output 86 to operate solenoid 82. First output 84 instructs a power control module 88 to provide third signal 40 (i.e., power) to shunt trip 80, which can separate contacts 24. Second output 86 instructs a gating circuit 90 to provide third signal 40 to solenoid 82 (i.e., flux shifter) to separate contacts 24. It should be noted that shunt trip 80 requires first source 52 to be present, while solenoid 82 can be operated only when second source 54 is present. In this manner, microprocessor 42 can operate circuit breaker 14 in response to second message 78 regardless of the state of first and second sources 52, 54.

In addition to operating circuit breaker 14, module 30 can communicate to one or more local input and/or output devices 94. For example, local output device 94 can be a module status indicator, such as a visual or audible indicator. In one embodiment, device 94 is a light emitting diode (LED) configured to communicate a status of module 30. In another embodiment, local input device 94 can be a status-modifying button for manually operating one or more portions of module 30. In yet another embodiment, local input device 94 is a module interface for locally communicating with module 30.

Accordingly, modules 30 are adapted to sample first signals 36 from sensors 34 as synchronized by the CCPU. Modules 30 then package the digital representations (i.e., digital signals 64) of first and second signals 36, 38, as well as other information, as required into first message 76. First message 76 from all modules 30 are sent to CCPU 28 via network 32. CCPU 28 processes first message 76 and generates and stores instructions to control the operation of each circuit breaker 14 in second message 78. CCPU 28 sends second message 78 to all of the modules 30. In an exemplary embodiment, CCPU 28 sends second message 78 to all of the modules 30 in response to synchronization instruction 70.

Accordingly, system 26 can control each circuit breaker 14 based on the information from that breaker alone, or in combination with the information from one or more of the other breakers in the system 26. Under normal operating conditions, system 26 performs all monitoring, protection, and control decisions at CCPU 28.

Since the protection and monitoring algorithms of system 26 are resident in CCPU 28, these algorithms can be enabled without requiring hardware or software changes in circuit breaker 14 or module 30. For example, system 26 can include a data entry device 92, such as a human-machine-interface (HMI), in communication with CCPU 28. In this embodiment, one or more attributes and functions of the protection and monitoring algorithms resident on CCPU 28 can easily be modified from data entry device 92. Thus, circuit breaker 14 and module 30 can be more standardized than was possible with the circuit breakers/trip units of prior systems. For example, over one hundred separate circuit breakers/trip units have been needed to provide a full range of sizes normally required for protection of a power distribution system. However, the generic nature of circuit breaker 14 and module 30 enabled by system 26 can reduce this number by over sixty percent. Thus, system 26 can resolve the inventory issues, retrofittability issues, design delay issues, installation delay issues, and cost issues of prior power distribution systems.

It should be recognized that system 26 is described above as having one CCPU 28 communication with modules 30 by way of a single network 32. However, it is contemplated by the present disclosure for system 26 to have redundant CCPUs 26 and networks 32 as illustrated in phantom in FIG. 1. For example, module 30 is illustrated in FIG. 2 having two network interfaces 46. Each interface 46 is configured to operatively connect module 30 to a separate CCPU 28 via a separate data network 32. In this manner, system 26 would remain operative even in case of a failure in one of the redundant systems.

Modules 30 can further include one or more backup systems for controlling breakers 14 independent of CCPU 28. For example, system 26 may be unable to protect circuit 16 in case of a power outage in first source 52, during the initial startup of CCPU 28, in case of a failure of network 32, and other reasons. Under these failure conditions, each module 30 includes one or more backup systems to ensure that at least some protection is provided to circuit breaker 14. The backup system can include one or more of an analog circuit driven by second source 54, a separate microprocessor driven by second source 54, and others.

Figure 3:
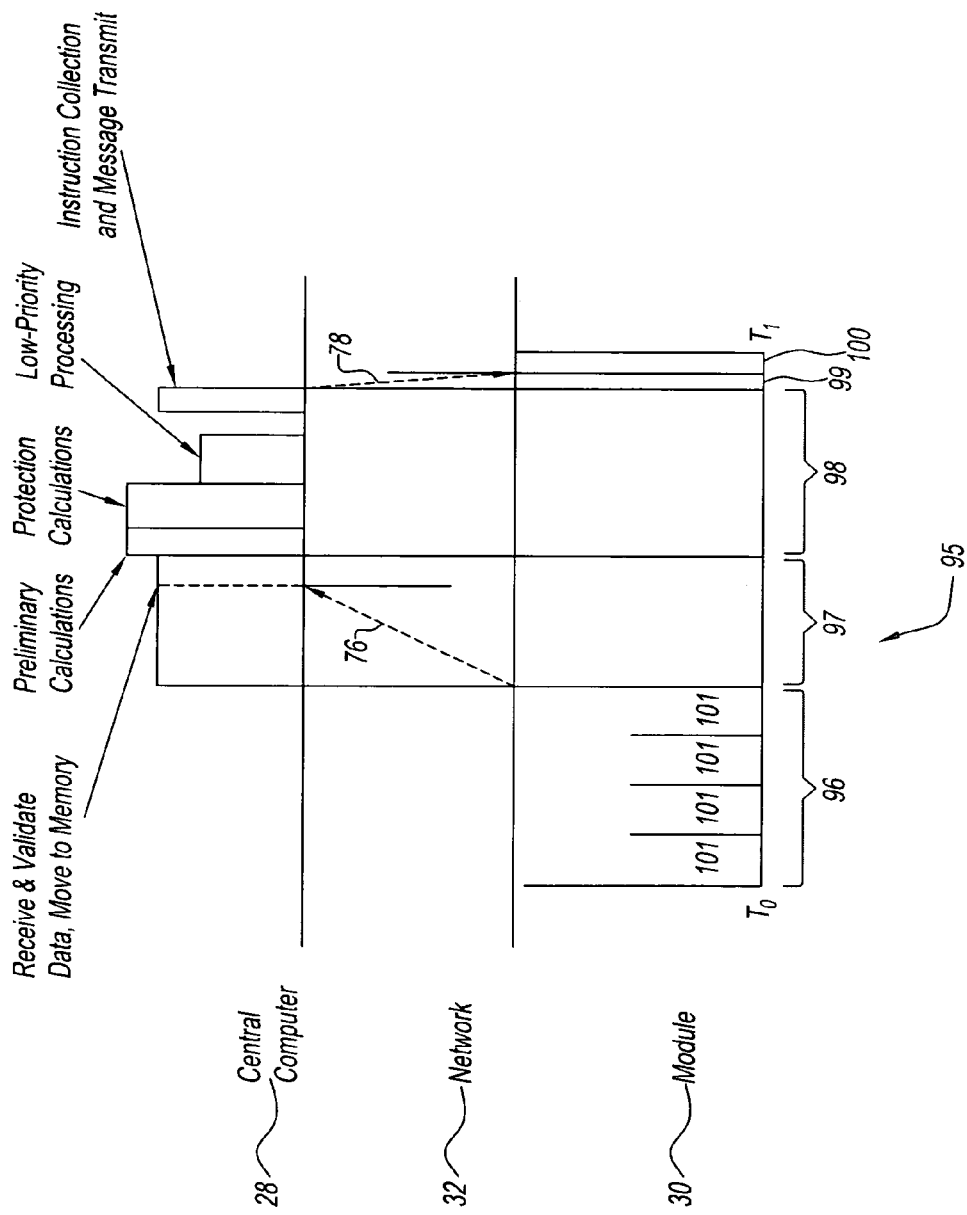
FIG. 3 illustrates an exemplary embodiment of a response time for the integrated protection, monitoring, and control system of FIG. 1.

Referring now to FIG. 3, an exemplary embodiment of a response time 95 for system 26 is illustrated with the system operating stably (e.g., not functioning in a start-up mode). Response time 95 is shown starting at T0 and ending at T1. Response time 95 is the sum of a sample time 96, a receive/validate time 97, a process time 98, a transmit time 99, and a decode/execute time 100.

In this example, system 26 includes twenty-four modules 30 each connected to a different circuit breaker 14. Each module 30 is scheduled by the phase-lock-loop algorithm and synchronization instruction 70 to sample its first signals 36 at a prescribed rate of 128 samples per cycle. Sample time 96 includes four sample intervals 101 of about 0.13 milliseconds (ms) each. Thus, sample time 96 is about 0.52 ms for data sampling and packaging into first message 76.

Receive/validate time 97 is initiated at the receipt of synchronization instruction 70. In an exemplary embodiment, receive/validate time 97 is a fixed time that is, for example, the time required to receive all first messages 76 as determined from the latency of data network 32. For example, receive/validate time 97 can be about 0.25 ms where each first message 76 has a size of about 1000 bits, system 26 includes twenty-four modules 30 (i.e., 24,000 bits), and network 32 is operating at about 100 Mbps. Accordingly, CCPU 28 manages the communications and moving of first messages 76 to the CCPU during receive/validate time 97.

The protection processes (i.e., process time 98) starts at the end of the fixed receive/validate time 97 regardless of the receipt of first messages 76. If any modules 30 are not sending first messages 76, CCPU 28 flags this error and performs all functions that have valid data. Since system 26 is responsible for protection and control of multiple modules 30, CCPU 28 is configured to not stop the entire system due to the loss of data (i.e., first message 76) from a single module 30. In an exemplary embodiment, process time 98 is about 0.27 ms.

CCPU 28 generates second message 78 during process time 98. Second message 78 can be twenty-four second messages (i.e., one per module 30) each having a size of about 64 bits per module. Alternately, it is contemplated by the present disclosure for second message 78 to be a single, multi-cast or broadcast message. In this embodiment, second message 78 includes instructions for each module 30 and has a size of about 1600 bits.

Transmit time 99 is the time necessary to transmit second message 78 across network 32. In the example where network 32 is operating at about 100 Mbps and second message 78 is about 1600 bits, transmit time 99 is about 0.016 ms.

It is also contemplated for second message 78 to include a portion of synchronization instruction 70. For example, CCPU 28 can be configured to send second message 78 upon receipt of the next synchronization instruction 70 from clock 72. In this example, the interval between consecutive second messages 76 can be measured by module 30 and the synchronization information in the second message, if any, can be used by the synchronization algorithm resident on microprocessor 42.

Once modules 30 receive second message 78, each module decodes the message and executes its instructions (i.e., send third signals 40), if any, in decode/execute time 100. For example, decode/execute time 100 can be about 0.05 ms.

In this example, response time 95 is about 1.11 ms. Of course, it should be recognized that system response time 95 can be accelerated or decelerated based upon the needs of system 26. For example, system response time 95 can be adjusted by changing one or more of the sample period, the number of samples per transmission, the number of modules 30, the message size, the message frequency, the message content, and/or the network speed.

It is contemplated by the present disclosure for system 26 to have response time 95 of up to about 3 milliseconds. Thus, system 26 is configured to open any of its circuit breakers within about 3 milliseconds from the time sensors 34 sense conditions outside of the set parameters.

Figure 4:
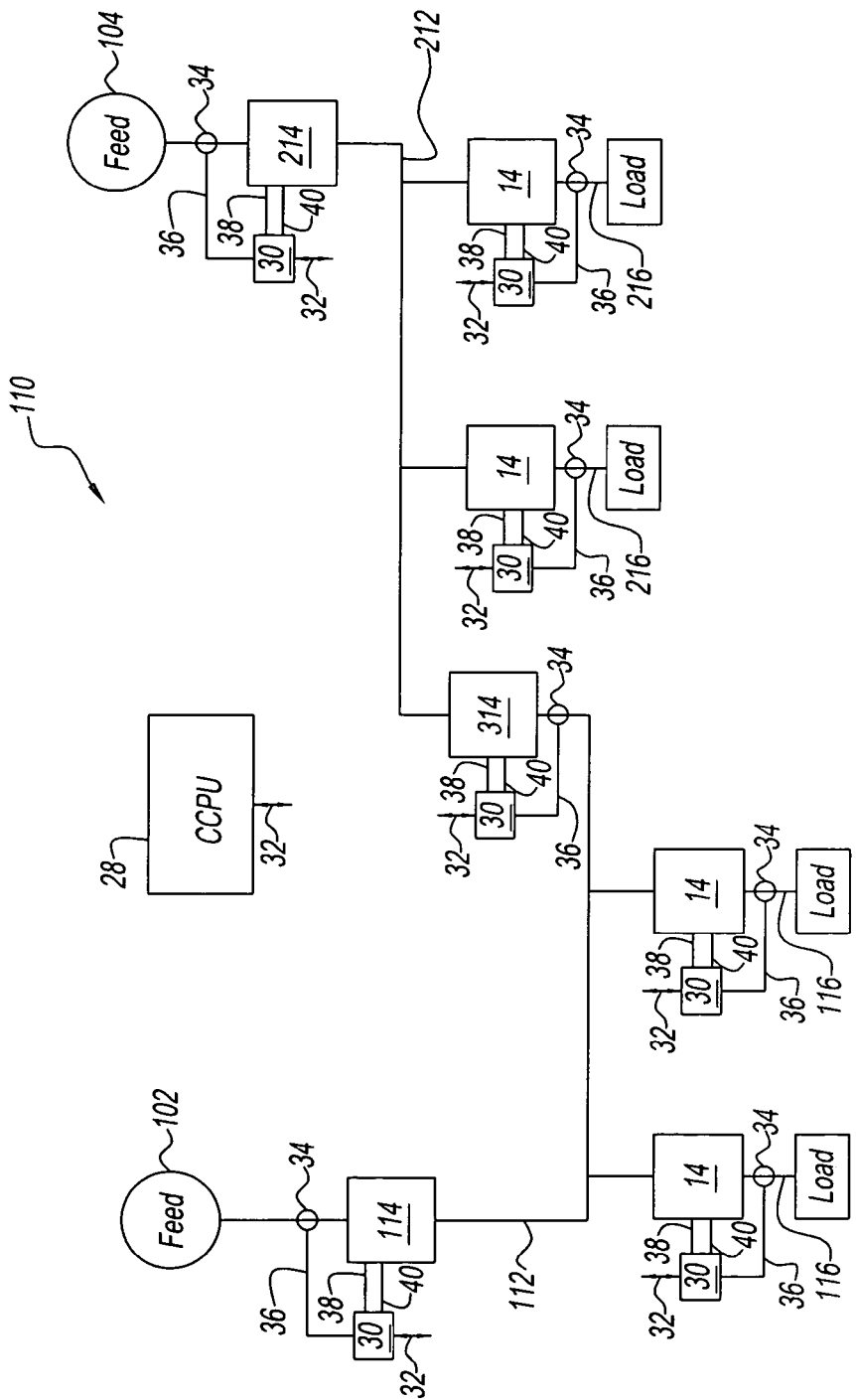
FIG. 4 is a schematic of a second power distribution system having an integrated protection, monitoring, and control system.

Accordingly, system 26 is centrally controlled by CCPU 28 to protect power distribution system 10 during the distribution of power to the loads (i.e., circuits 16). In addition to this load management capability, system 26 can also provide integrated feed management capabilities to a power distribution system 110 as illustrated in FIG. 4 where component parts performing similar and/or analogous functions are labeled in multiples of one hundred.

Power distribution system 110 has a first feed 102 and a second feed 104. Power is supplied to first and second feeds 102, 104 from a source (not shown) such as, an electric generator driven by a prime mover locally, or a power grid of an electric utility. The prime mover may be powered from, for example, but not limited to, a turbine or an internal combustion engine. In an exemplary embodiment, power is supplied to first feed 102 from a first point on a power grid, while power is supplied to second feed 104 from a second point on the power grid.

Power from first feed 102 is connectable to a first bus 112 by a first main breaker 114. First bus 112 is divided into a number of circuits 116 by sub-breakers 14. Thus, circuits 116 can be provided with power from first feed 102 by closing first main breaker 114 and sub-breakers 14 on first bus 112.

Similarly, power from second feed 104 is connectable to a second power bus 212 by a second main breaker 214. Second bus 212 is divided into a number of circuits 216 by sub-breakers 14. Thus, circuits 216 can be provided with power from second feed 102 by closing second main breaker 214 and sub-breakers 14 on second bus 212. First and second buses 112, 212 are also connectable to one another by a tie-breaker 314.

Power distribution system 110 is provided with system 26. Specifically, each breaker 14, 114, 214, and 314 in power distribution system 110 includes module 30 communicating with CCPU 28 via network 32. Advantageously, system 26 manages the distribution of power from power feeds 102, 104 using the same set of data as used for the load management. Further, system 26 manages the distribution of power from power feeds 102, 104 simultaneous with the load management control decisions. In this manner, system 26 can integrate the load management decisions with the feed management decisions and, thus, can provide for more precise control of power distribution system 110 than previously possible.

In the case of a loss of power in either first or second feeds 102, 104, first and second buses 112, 212 can be powered by the other bus through the closing of tie-breaker 314. For example, if power from first feed 102 is unavailable, CCPU 28 can open first main breaker 114 and close tie-breaker 314 to provide power to first bus 112 from second bus 212 (e.g., a throw over). Further, once power becomes available from first feed 102, CCPU 28 can close first main breaker 114 and open tie-breaker 314 to provide power to first bus 112 from the first source (e.g., a throw back).

Conversely, if power from second feed 104 is unavailable, CCPU 28 can open second main breaker 214 and close tie-breaker 314 to provide power to second bus 212 from first bus 112. Again, once power becomes available from second feed 104, CCPU 28 can close second main breaker 114 and open tie-breaker 314 to provide power to second bus 212 from the second source.

Accordingly, system 26 also provides for seamless integration in the management among feeds 102, 104 in power distribution system 110 (e.g., throw-over and throw-back). Advantageously, system 26 can manage the throw-over and/or throw-back among feeds 102, 104 without interrupting power to circuits 116, 216.

For example, when power from second feed 104 is feeding both second bus 212 and first bus 112, both second main breaker 214 and tie-breaker 314 are in a closed state, while first main breaker 114 is in an open state. Once power to main feed 102 is restored, system 26 ensures that power feeds 102, 104 are equal in magnitude, frequency, and phase at CCPU 28 via data from modules 30 at main breakers 114, 214, respectively. Once system 26 detects that power feeds 102, 104 are equal, CCPU 28 can close first main breaker 114 before or substantially simultaneously to opening tie-breaker 314. It is contemplated by the present disclosure for system 26 to open tie-breaker 314 within 100 milliseconds of closing first main breaker 114.

In this configuration, system 26 can provide over-current protection at any circuit breaker 14 even in the event that sensor 34 at that circuit breaker malfunctions. Take for example the instance where power from first feed 102 is supplied only to first bus 112 (i.e., tie-breaker 314 is open). In this situation, system 26 can provide over current protection to first main breaker 114 even in the event that sensor 34 at the first main breaker malfunctions. Here, the over-current functions of first main breaker 114 would be directed to function with the sum of the current signals of all the breakers 14 on first bus 112.

System 26 can also allow first main breaker 114 to be configured to handle the maximum current that first bus 112 may carry. Additionally, first main breaker 114 can include a current setting equal to that of each of breakers 14 on first bus 112 and a time characteristic that allows the first main breaker to provide backup protection to each individual breaker at that breaker's setting. In this example, CCPU 28 would simultaneously monitor the current at first bus 112 and each of the branch circuits 116, reacting to an undesirable current at any point. Thus, system 26 can provide each branch circuit 116 with secondary backup protection optimally set to supplement the primary protection with no compromise needed to achieve selectivity or to allow the bus current to flow unimpeded.

Accordingly, system 26 integrates the load management of the branch circuits to one another. Further, system 26 integrates the management of the loads on the branch circuits with the management of the power feeds feeding the branch circuits. Still further, system 26 provides this integrated functionality in a single central processor. This allows system 26 to adjust the protection functions of each breaker 14, 114, 214, 314 in the system based on the state of that breaker as sampled by first and second signals 38, 40, as well as based on the status of any and/or all of the other breakers in the system.

It should also be noted that the terms "first", "second", "third", "upper", "lower", and the like may be used herein to modify various elements. These modifiers do not imply a spatial, sequential, or hierarchical order to the modified elements unless specifically stated.

While the instant disclosure has been described with reference to one or more exemplary embodiments, it will be understood by those skilled in the art that various changes may be made and equivalents may be substituted for elements thereof without departing from the scope thereof. In addition, many modifications may be made to adapt a particular situation or material to the teachings of the disclosure without departing from the scope thereof. Therefore, it is intended that the disclosure not be limited to the particular embodiment(s) disclosed as the best mode contemplated for carrying out this invention, but that the invention will include all embodiments falling within the scope of the appended claims.

What is claimed is:

1. A protection system for a power distribution system, comprising
    a central computer;
    a plurality of data modules each in communication with a different circuit breaker of the power distribution system; and
    a data network communicating between said central computer and said plurality of data modules, wherein said central computer sends an instruction to said plurality of data modules over said data network, each of said plurality of data modules adjusting a sample period based on said instruction to aid in synchronization of sampling of a power condition at said plurality of data modules.

2. The protection system as in claim 1, wherein said instruction ensures that all of said plurality of data modules sample said condition within a predetermined time-window.

3. The protection system as in claim 2, wherein said predetermined time-window is less than about ten microseconds.

4. The protection system as in claim 2, wherein said predetermined time-window is about five microseconds.

5. The protection system as in claim 1, wherein the protection system has a consistent fault response time.

6. The protection system as in claim 5, wherein said consistent fault response time is less than a single cycle of power in the power distribution system.

7. The protection system as in claim 1, wherein each of said plurality of data modules is configured to package said condition in a first message, which is communicated to said central computer over said data network.

8. The protection system as in claim 7, wherein said central computer provides a second message to said plurality of data modules based upon said first message.

9. The protection system as in claim 8, wherein said central computer sends said second message in response to said instruction.

10. The protection system as in claim 8, wherein said second message comprises at least a portion of said instruction.

11. The protection system as in claim 8, wherein said second message instructs at least one of said plurality of data modules to operate its associated circuit breaker.

12. The protection system as in claim 1, wherein said central computer performs all protection decisions, control decisions, and monitoring decisions of the power distribution system.

13. The protection system as in claim 1, wherein said central computer integrates management of power to one or more loads in the power distribution system with management of power from one or more feeds in the power distribution system.

14. A method of protecting a power distribution system, comprising:
    sending a synchronization instruction to a plurality of data modules;
    running a phase-lock-loop algorithm on each of said plurality of data modules;
    sampling a power condition from the power distribution system based upon said phase-lock-loop algorithm as adjusted by said synchronization instruction, each of said plurality of data modules being in communication with a different set of separable contacts in the power distribution system;

transmitting a first message containing said power condition from each of said plurality of data modules to a central computer;

determining a second message in said central computer based upon said first message; and transmitting said second message to each of said plurality of data modules so that one or more of said plurality of data modules operates said different set of separable contacts in response to said second message.

15. The method as in claim 14, wherein said synchronization instruction is sent from a device internal or external to said central computer.

16. The method as in claim 14, wherein said synchronization instruction ensures that said power condition is sampled within a predetermined time-window.

17. The method as in claim 16, wherein said predetermined time-window is less than about ten microseconds.

18. The method as in claim 17, wherein said predetermined time-window is about five microseconds.

19. The method as in claim 14, further comprising integrating management of power to one or more loads in the power distribution system with management of power from one or more feeds in the power distribution system.

20. A method of protecting a power distribution system, comprising:

sending a synchronization instruction to a plurality of data modules;

running a phase-lock-loop algorithm on each of said plurality of data modules;

sampling a power condition from the power distribution system based upon said phase-lock-loop algorithm as adjusted by said synchronization instruction, each of said plurality of data modules being in communication with a different set of separable contacts in the power distribution system;

transmitting a first message containing said power condition from each of said plurality of data modules to a central computer;

determining a second message in said central computer based upon said first message; and transmitting said second message to each of said plurality of data modules so that one or more of said plurality of data modules operates said different set of separable contacts in response to said second message, wherein said second message includes at least a portion of said synchronization instruction.

21. A method of protecting a power distribution system, comprising:

sending a synchronization instruction to a plurality of data modules;

running a phase-lock-loop algorithm on each of said plurality of data modules;

sampling a power condition from the power distribution system based upon said phase-lock-loop algorithm as adjusted by said synchronization instruction, each of said plurality of data modules being in communication with a different set of separable contacts in the power distribution system;

transmitting a first message containing said power condition from each of said plurality of data modules to a central computer;

determining a second message in said central computer based upon said first message; and transmitting said second message to each of said plurality of data modules so that one or more of said plurality of data modules operates said different set of separable contacts in response to said second message, wherein said central computer performs all protection decisions, control decisions, and monitoring decisions of the power distribution system.

22. A power distribution system comprising:

a processing unit;

a first power bus for powering a first branch circuit through a first circuit breaker and a second branch circuit through a second circuit breaker;

a first data module configured to operate said first circuit breaker and to sample a first parameter from said first branch circuit;

a second data module configured to operate said second circuit breaker and to sample a second parameter from said second branch circuit; and a data network linking said first and second data modules to said processing unit, said processing unit performing all primary power distribution functions for the power distribution system based on said first and second parameters, wherein said processing unit communicates a synchronization signal to said first and second data modules so that said first and second data modules sample said first and second parameters, respectively, with in a predetermined time-window.

23. The power distribution system as in claim 22, wherein said first and second parameters are selected from the group consisting of: a load current, a voltage potential, a position of a circuit breaker auxiliary switch, and a status of a circuit breaker operating spring charge.

24. The power distribution system as in claim 22, wherein said primary power distribution functions comprises functions selected from the group consisting of instantaneous over current functions, short time over current functions, longtime over current functions, relay protection functions, logic control functions, digital signal processing functions, and combinations of any of the foregoing.

25. The power distribution system as in claim 22, wherein said data network is an Ethernet network having a star topology.

26. The power distribution system as in claim 22, wherein said predetermined time-window is less than about ten microseconds.

27. The power distribution system as in claim 26, wherein said predetermined time-window is about five microseconds.

28. The power distribution system as in claim 22, further comprising:

a first main breaker for providing power from a first power feed to said first power bus; and a first main data module configured to operate said first main circuit breaker and to sample a first main parameter from said first power feed, wherein said processing unit communicates said synchronization signal to said main data module, said main data module sampling said first main parameter based in part based on said synchronization signal, and said main data module sending said first main parameter to said processing unit.

29. A power distribution system comprising:

a processing unit;

a first power bus for powering a first branch circuit through a first circuit breaker and a second branch circuit through a second circuit breaker;

a first data module configured to operate said first circuit breaker and to sample a first parameter from said first branch circuit;

a second data module configured to operate said second circuit breaker and to sample a second parameter from said second branch circuit;

a data network linking said first and second data modules to said processing unit, said processing unit performing all primary power distribution functions for the power distribution system based on said first and second parameters, wherein said processing unit communicates a synchronization signal to said first and second data modules so that said first and second data modules sample said first and second parameters, respectively, within a predetermined time-window;

a first main breaker for providing power from a first power feed to said first power bus;

a first main data module configured to operate said first main circuit breaker and to sample a first main parameter from said first power feed, wherein said processing unit communicates said synchronization signal to said main data module, said main data module sampling said first main parameter based in part based on said synchronization signal, and said main data module sending said first main parameter to said processing unit;

a second main breaker for providing power from a second power feed to a second power bus;

a second main data module configured to operate said second main circuit breaker and to sample a second main parameter from said second power feed;

a tie breaker for providing power between said first and second power buses; and a tie breaker data module configured to operate said tie breaker and to sample a tie parameters from said first and/or second power buses, wherein said first main, second main, and tie data modules sample said first main, said second main, and said tie parameters, respectively, and send said first main, said second main, and said tie parameters, respectively, to said processing unit so that said central control processing unit can perform all primary power distribution functions for the power distribution system.

* * * * *